March 13, 1951     L. W. GRAHAM     2,545,080
DRIVING DEVICE FOR IMPARTING A COMBINED ROTARY
AND RECIPROCATING MOTION TO A DRIVEN MEMBER
Filed Aug. 29, 1947

INVENTOR
LEONARD WILLIAM GRAHAM
BY *Frederick E. Haynes*
ATTORNEY

Patented Mar. 13, 1951

2,545,080

UNITED STATES PATENT OFFICE 2,545,080

DRIVING DEVICE FOR IMPARTING A COMBINED ROTARY AND RECIPROCATING MOTION TO A DRIVEN MEMBER

Leonard William Graham, Slough, Bucks, England

Application August 29, 1947, Serial No. 771,258
In Great Britain December 16, 1946

3 Claims. (Cl. 242—84.4)

This invention relates to driving devices, particularly to driving devices in which it is desired to impart a combined rotary and reciprocating motion to a driven member.

Another, more specific object of the invention is to provide a driving device, particularly a gear drive, in which a rotary movement of a driving member will produce a combined rotary and reciprocating movement of a driven member.

Another object of the invention is to provide a novel and improved gear drive by means of which a desired velocity of rotation and range of reciprocity of the driven member can be attained in a convenient and simple manner.

Another object of the invention is to provide a novel and improved driving device which is sturdy in design and can be inexpensively and accurately manufactured.

Another object of the invention is to provide a novel driving device which can be advantageously used as part of a fishing reel, partly of a fishing reel of the type known as spinning reel.

Another object of the invention is a fishing reel in which a combined rotary and reciprocating motion is imparted to the reel proper by operating the reel handle or crank, and in which only a minimum of gear parts—generally two—are required to impart the said motion to the reel proper.

Other objects, features and advantages will appear hereinafter in the specification and in the appended claims forming part of the application.

In the accompanying drawing a now preferred embodiment of the invention is shown by way of illustration and not by way of limitation.

Figure 1:
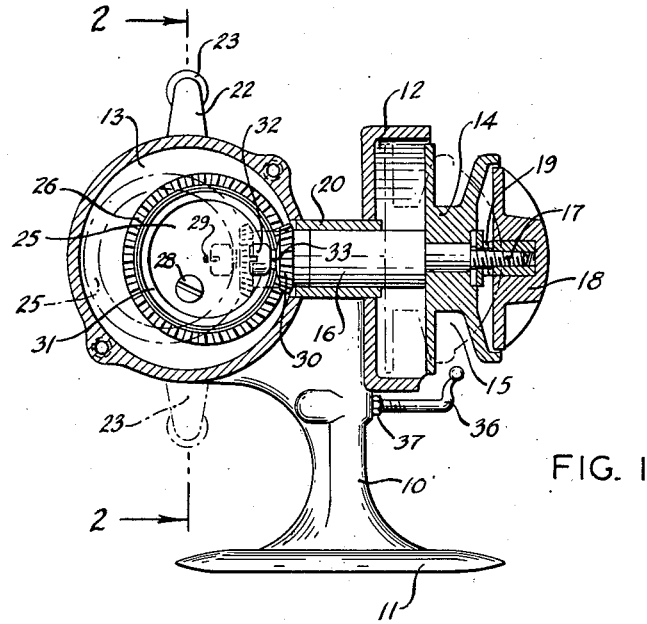
Fig. 1 is an elevational sectional view of a fishing reel including a gear drive according to the invention.

Referring now to the drawing in detail, the invention is shown as a gear drive forming part of a fishing reel of the type known as spinning reel. However, it should be understood that the usefulness of the invention is not limited to such application but that the driving device according to the invention can be employed wherever a combined rotary and reciprocating motion of a driven member is required.

The spinning reel, as shown, comprises a housing 10 made of any suitable material such as metal. The housing is provided with a conventional foot 11 by means of which the reel can be removably attached to a fishing rod (not shown). Housing 10 which may be made of one piece or several portions joined together is shaped to form an open cup-shaped compartment 12 and a closed compartment 13. Compartment 12 houses a reel 14 having a deep groove 15 to receive the fishing line (not shown).

Figure 3:
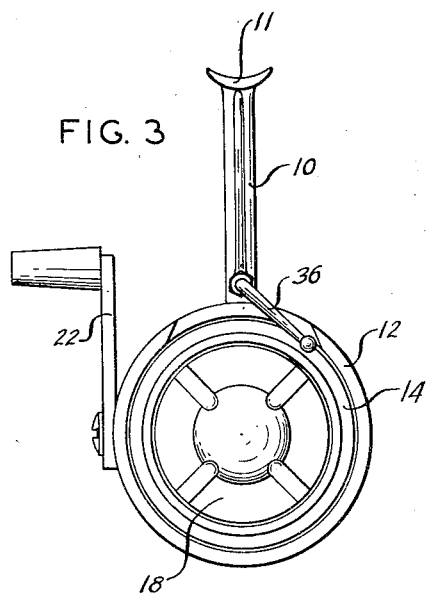
Fig. 3 is a side view upon the reel proper of the fishing reel.
Figure 2:
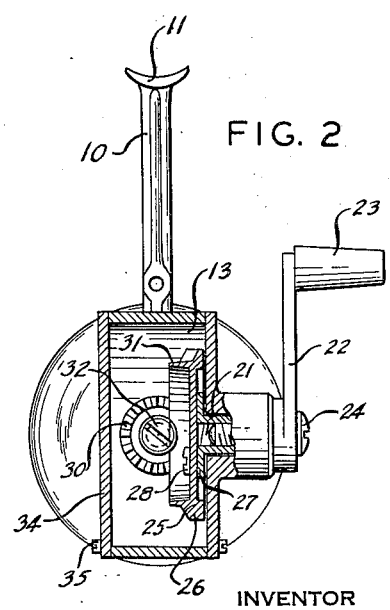
Fig. 2 is a section along line 2—2 of Fig. 1.

According to some of the previously enumerated objects of the invention, it is intended to impart a combined rotary and axially reciprocating movement to reel 14. For this purpose, reel 14 is mounted on a shaft 16 by any suitable means such as a threaded shaft portion 17 and a nut 18. Nut 18 is shaped to cover the face of the reel as can best be seen on Fig. 3. A spring washer 19 may be interposed between cover 18 and reel 14. Shaft 16 is rotatably and axially slidably supported in a bearing portion 20 of housing 10. The housing further supports a hollow shaft 21 rotatably mounted in housing 10 and extending into compartment 13 as also does shaft 16. Fastened to shaft 21 is a crank 22 provided with a handle 23. The crank can be fastened to shaft 21 by any suitable means such as a screw 24 threaded into the hollow shaft 21. As will be evident, a rotation of crank 22 will cause a corresponding rotation of shaft 21.

For the purpose of transmitting rotation of shaft 21 to reel 14 and of converting such rotation into a corresponding rotary and axially reciprocating movement of the reel, shaft 21 supports a driving member shown as a bevel gear 25 having teeth 26 with constant pitch on its circumference. Gear 25 is fastened eccentrically to shaft 21 by any suitable means such as a flange 27 of the shaft and a screw 28. As it will be apparent, a rotation of shaft 21 will cause an eccentric rotation of gear 25. The degree of eccentricity is determined by the distance between the axis of rotation and the center 29 of the gear so that the eccentricity can be conveniently adjusted by varying said distance. The bevel gear coacts with and is engaged by a pinion 30 constituting the driven member of the gear drive and supported by or integral with shaft 16.

While the torque transmitting engagement between driving member and driven member is here shown as the engagement of two meshing gears, it will be evident to a person skilled in the art that in certain instances the same result can be attained by employing a frictional engagement.

For the purpose of imparting the desired axially reciprocating movement to shaft 16, there is provided on the face of bevel gear 25, an annular guiding means 31 shown as a ring flange having its center concentrically with center 29 of the bevel gear. This ring is engaged by an extension or collar shown as a screw 32 fastened to the head of shaft 16 and having a groove 33 into which the rim of ring 31 is fitted. As a result, shaft 16 is compelled to follow the eccentric rotation of the bevel gear and hence perform corresponding axially reciprocating movements. Compartment 13 is closed by a cover 34 fastened thereto by any suitable means such as screw 35. A guide arm 36 is screwed into housing 10 and may be fixed in its position by means of a nut 37. This guide arm serves to guide the fishing line when wound upon reel 14 or payed out therefrom.

The operation of the gear drive according to the invention is as follows:

When shaft 21 is rotated by means of crank 22, the ensuing eccentric rotation of bevel gear 25 will cause a corresponding rotation of reel 14 by the agency of pinion 30 and shaft 16. Simultaneously, shaft 16 and with it the reel will perform an axially reciprocating movement by reason of the eccentric rotation of the ring about the center of rotation 29.

As a result, reel 14 will rotate and also be moved inwardly and outwardly, the extreme outer position of the reel being shown in full lines and the extreme inner position being shown in dotted lines, thereby causing a uniform distribution of the fishing line on the reel and facilitating the paying out of line, for instance for casting purposes.

What is claimed as new and desired to be secured by Letters Patent is:

1. A gear drive for imparting a combined rotary and reciprocating motion to a driven member comprising in combination a housing, a driven shaft mounted rotatably and axially slidably in said housing, one end of said shaft protruding from the housing and the other extending into the same, a beveled pinion and an annular grooved collar concentrically secured to said latter shaft end for rotation in unison with the shaft, a driving shaft mounted rotatably in said housing at an angle of 90° to said driven shaft, one end of said driving shaft extending into the housing, a bevel gear disc eccentrically secured to the said driving shaft end and positioned in mesh with said pinion for rotating the driven shaft in response to a rotation of the driving shaft, the circumference of the gear disc being larger than the circumference of the pinion so as to provide a stepped-up ratio of transmission between the gear disc and the pinion, said bevel gear disc having an annular rib raised from the disc and disposed within the circumference defined by the teeth of the gear disc concentrically with the eccentric gear axis, said rib being in engagement with the said collar groove for maintaining engagement between the teeth of the gear disc and the pinion and for imparting a reciprocal axial displacement to the driven shaft corresponding to the eccentricity of rotation of the bevel gear disc.

2. In a gear drive for imparting a combined rotary and reciprocating motion to a driven member, the combination of a driving member comprising a bevel gear and a driving shaft rotatably mounted and eccentrically supporting the bevel gear, a driven member comprising a driven shaft rotatable and axially slidably supported and a beveled pinion centrically supported on the driven shaft and engaged by said bevel gear for rotating the driven shaft in response to a rotation of the driving shaft, the circumference of said gear being larger than the circumference of said pinion so as to provide a stepped-up ratio of transmission between the gear and the pinion, a ring shaped member mounted concentrically with the center axis of the bevel gear, and an annular grooved collar concentrically supported on the driven shaft and engaging said ring member for maintaining engagement between the teeth of the gear and the pinion and for imparting a reciprocating axial displacement to the driven shaft corresponding to the eccentricity of rotation of the bevel gear.

3. In a fishing reel having a spool adapted to receive a fishing line thereon, in combination a housing, a driven shaft mounted rotatably and axially slidably in said housing, one end of the shaft protruding from the housing and the other extending into the same, said protruding shaft end supporting the spool for rotation in unison therewith, a beveled pinion and an annular grooved collar concentrically secured to said latter shaft end for rotation in unison with the shaft, a driving shaft mounted rotatably in said housing at an angle of 90° to said driven shaft, one end of said driving shaft extending into the housing, a bevel gear disc eccentrically secured to the said driving shaft end and positioned in mesh with said pinion for rotating the driven shaft in response to a rotation of the driving shaft, the circumference of the gear disc being larger than the circumference of the pinion so as to provide a stepped-up ratio of transmission between the gear disc and the pinion, said bevel gear disc having an annular rib raised from the disc and disposed within the circumference defined by the teeth of the gear disc concentrically with the eccentric gear axis, said rib being in engagement with the said collar groove for maintaining engagement between the teeth of the gear disc and the pinion and for imparting a reciprocal axial displacement to the driven shaft and, hence, to the spool corresponding to the eccentricity of rotation of the bevel gear disc.

LEONARD WILLIAM GRAHAM.

REFERENCES CITED

The following references are of record in the file of this patent:

UNITED STATES PATENTS

| Number | Name | Date |
| --- | --- | --- |
| 849,530 | Clay | Apr. 9, 1907 |
| 901,070 | Clay | Oct. 13, 1908 |

FOREIGN PATENTS

| Number | Country | Date |
| --- | --- | --- |
| 202,187 | Switzerland | Jan. 15, 1939 |
| 420,222 | Great Britain | Nov. 20, 1934 |
| 839,627 | France | Jan. 4, 1939 |